Figure 1:
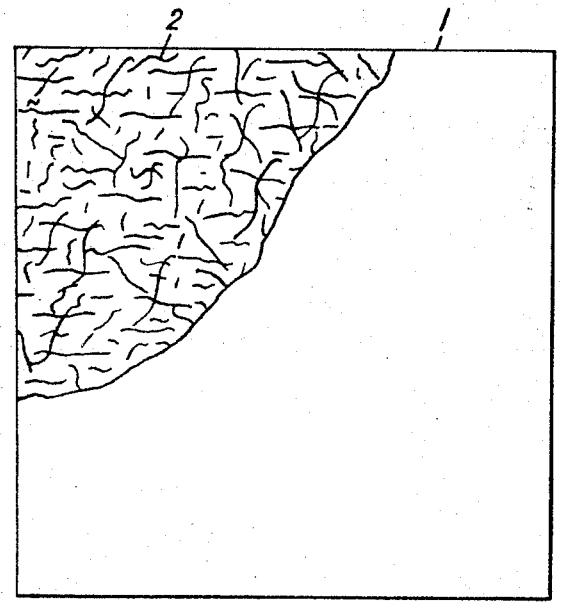

Aug. 12, 1969   G. L. WICKER   3,461,012
MANUFACTURE OF THERMOPLASTIC SHEET
Filed June 15, 1965

Inventor
George Leonard Wicker
By
Bailey, Stephens + Huettig
Attorneys

United States Patent Office 3,461,012
Patented Aug. 12, 1969

3,461,012
MANUFACTURE OF THERMOPLASTIC SHEET
George Leonard Wicker, Milnrow, Rochdale, England, assignor to Turner Brothers Asbestos Company Limited, Manchester, England, a British company
Continuation-in-part of application Ser. No. 237,195, Nov. 13, 1962. This application June 15, 1965, Ser. No. 464,149
Claims priority, application Great Britain, Nov. 13, 1961, 40,520/61; June 15, 1964, 24,749/64
Int. Cl. B32b 17/04, 23/10
U.S. Cl. 156—193    5 Claims This application is a continuation-in-part of my copending application Ser. No. 237,195 filed Nov. 13, 1962 for "Manufacture of Thermoplastic Sheet," now abandoned.

Rigid thermoplastic mouldings can advantageously be made by moulding heated sheets of a thermoplastic material that is rigid at room temperature. Suitable thermoplastic materials for this purpose are or consist essentially of one or more of the polymers of styrene, methylmethacrylate and acrylonitrile and copolymers in which one of these monomers predominates. Many of these materials are available in sheet form and can readily be converted into unreinforced mouldings.

Now for many purposes reinforced mouldings are required, and it is desirable to introduce fibrous reinforcement into the thermoplastic material. It is known to introduce asbestos or other fibres into plasticised polyvinyl chloride to produce flexible tiles, but satisfactory rigid sheets cannot be made by a similar process. To produce a reinforced rigid moulding of polystyrene or a similar thermoplastic material it has been necessary hitherto either to incorporate reinforcing fibres in the thermoplastic material and convert this into pellet form, and then make the product by injection-molding the pellets, or to impregnate wire mesh, glass cloth, glass mat or similar preformed reinforcement with the thermoplastic material.

The present invention comprises as a novel product a rigid sheet composed of a polymeric constituent with fibres uniformly dispersed throughout it and predominantly randomly oriented in the plane of the sheet. The polymeric constituent is based predominantly on one or more of styrene, methylmethacrylate and acrylonitrile. In the simplest case the polymeric constituent may be a single polymer, e.g. polystyrene. It may also be a single copolymer, e.g. of styrene and butadiene, the styrene predominating, or of acrylonitrile, butadiene and styrene, the acrylonitrile and styrene together predominating. Again it may consist of a polymer mixture, a copolymer mixture or a polymer-copolymer mixture. Examples of such mixtures are polystyrene mixed with (or modified by) a styrene-butadiene copolymer and polystyrene mixed with (or modified by) a copolymer of styrene and maleate ester.

It is of course well known that by varying the proportions of the monomers in copolymer products with different properties are obtained, many copolymers of acrylonitrile and butadiene for instance, being of a rubber-like nature and therefore flexible. Although the reinforcement is an important factor in imparting rigidity to the sheet, it is ncessary to ensure that if the polymeric constituent includes butadiene or other monomer which tends to give a flexible copolymer the proportion of that monomer is so low that the polymeric constituent would, if not reinforced, be rigid or substantially rigid at room temperature.

Such sheets are suitable for moulding, but do suffer from the disadvantage that they are inflammable. I have found that the fire-resistance of such sheets is greatly increased if the polymeric constituent is based additionally on a lesser proportion of a vinyl chloride polymer, the vinyl chloride polymer preferably being a vinyl chloride homopolymer, although it may also be a copolymer of vinyl chloride with vinyl acetate or vinylidene chloride.

The vinyl chloride polymer is present in an amount of less than half the total amount of polymer constituent. It may comprise at least 10%, for example from 10 to 49% of the total polymeric constituent, the remainder being based predominantly on styrene, methyl methacrylate or acrylonitrile, or more than one of these. I prefer that the amount of polymeric constituent should be about 50% of the total weight of the sheet in which case the vinyl chloride polymer comprises, say, from 10 to 15% of the sheet. The sheets containing vinyl chloride polymer have good fire retardance and the inclusion of vinyl chloride polymer with the remainder of the polymeric constituent does not substantially affect the strength properties of the sheets. The vinyl chloride polymer is preferably unplasticised, since the presence of plasticiser may affect the strength of the sheets.

Antimony oxide may be included in the sheets to improve fire retardance still further.

It is desirable that in the sheet the proportion of the fibres should be as high as possible, and it is advantageously at least 20%. The polymeric constituent may be from 40 to 80% of the total sheet. These percentages, and all others in this specification, are by weight.

Inorganic fibres give better rigidity than organic fibres, and it is therefore preferable that the fibres should be wholly or predominantly inorganic, say at least 90% inorganic.

For moulding purposes, what is required is a sheet which can be readily moulded to a desired shape. As the reinforcement is composed of fibres which can flow freely and individually in any direction during moulding (loose fibers), their movement is not restricted as is the case of preformed reinforcements such as woven cloths or mats. This ability enhances the mouldability of the sheets. For maximum mouldability, the fibres should be short, but on the other hand the longer the fibres are, the better the strength properties. It is highly desirable that the inorganic fibres should contain a proportion of asbestos fibre, and asbestos preferably constitutes from 20 to 100% of the total fibre. Glass fibres are also suitable, and advantageously a mixture of asbestos and glass is used. I find that "opened" asbestos fibres of average length from 0.15 to 0.20 inch and chopped staple glass fibres from 0.25 to 1.0 inch are suitable. Mixtures of short fibres with varying proportions of longer fibres, say, up to 2", may also be used and their use makes it possible to increase the strength properties without materially reducing the mouldability. The longer fibres may be asbestos, glass or organic. Broadly there may be from 80 to 100% inorganic fibres less than 1 inch long and from 0 to 20% fibres between 1 and 2 inches long.

The method of manufacture of the sheets is an important feature of the invention. This method comprises converting the polymeric constituent in liquid form and the fibres into a substantially homogeneous dough-like mass, building up the mass in laminations into a sheet on a hot calender bowl, cutting the sheet thus formed on the bowl and removing it from the bowl, and allowing it to cool to a rigid sheet.

One reason why the polymeric constituent is used in liquid form is that otherwise it would have to be melted with resultant damage to the fibres. Another reason is that in building up the sheet on the hot calender bowl it is necessary that successive laminations should adhere to one another, and it is found that only by the use of the liquid form of the polymeric constituent can good adhesion be obtained. Moreover, in forming the dough-like compound it is important to wet all the fibres, and this can be done by introducing the polymeric constituent in liquid form. The liquid may be an aqueous emulsion (conveniently a latex) or an organic solution. Emulsions of polystyrene and the other polymers and copolymers are available on the market. Any volatile constituent of the emulsion or solution will be removed in the hot-calendering or in the mixing.

Rigid sheets in which the polymeric constituent is based predominantly on styrene but also contains some polyvinyl chloride are particularly useful. However, compatability between molten polystyrene and molten polyvinyl chloride is notoriously poor and the normal calendering technique in which a sheet is formed from a molten mix, which in this case would be of polystyrene and polyvinyl chloride, and compressed down to a thin sheet does not yield a homogeneous sheet. The adoption of the method of lamination described permits homogeneous sheets of reinforced polystyrene containing a minor proportion of polyvinyl chloride to be made. The method is, of course, also applicable to the production of sheets in which any other polymeric constituent based predominantly on styrene, methylmethacrylate or acrylonitrile or more than one of these and a minor proportion of vinyl chloride is used.

In carrying out the invention it is important to ensure that the successive laminations adhere well during the calendering and that a tough, strong sheet is formed. At the same time the sheet formed on the calender bowl must not stick to the bowl. Water present in the emulsion serves as a release agent to prevent excessive adhesion of the sheet to the calender bowl, but also reduces the tackiness required to enable the laminations to adhere together. Tackiness is best ensured by the presence of a high proportion of the polymer itself in the form of a solution. To produce the desired wetting, toughness and tackiness with ease of removal of the sheet from the bowl, it is convenient to form the dough-like mass from both an emulsion and a solution, and in these the polymers or copolymers may be the same or different. Some of the solvent may be removed in the mixing, and to ensure the desired tackiness the mixer may be heated towards the end of the mixing. The solvent for polystyrene may be styrene itself. As the styrene is volatile some of it is lost but it appears to be polymerised to some extent during the process. Preferably the styrene is used in catalyzed form, because then it polymerises faster, with the result that more of it is retained in polymer form in the dough-like mass.

Homogeneous distribution of the fibres without degradation is important, and the dough-like mass should be formed in a mixer which will not produce excessive fibre degradation.

When polyvinyl chloride forms part of the polymeric constituent, it is preferably introduced into the dough-like mass in particulate form. It can also be introduced as a dispersion, for example by mixing polyvinyl chloride powder into the solution of the dissolved part of the polymer constituent. Any antimony oxide to be present may also conveniently be mixed into this solution. Conveniently the styrene may be present not as the simple homopolymer of styrene but as a copolymer with the diester of maleic acid and a $C_8$ alcohol sold under the trademark "Alphanol" or with some other similar ester formed from an unsaturated dicarboxylic acid and an alcohol of medium chain length or a mixture of such alcohols since the ester moiety acts as a plasticiser for the styrene.

The calender used in forming the sheet may be of the type comprising a large steam-heated bowl and a smaller water-cooled bowl which can be moved apart from one another. The dough-like mass is fed into the nip of the calender, and at the end of each revolution the distance between the bowls is increased, so that the mass is built up in laminations on the hot bowl to the required thickness.

The method of the invention is advantageous in that calendering the dough-like mass to sheet causes little or no degradation of the fibres to take place and leads to only a little alignment of the fibres, thus avoiding pronounced unidirectional strength. If, however, unidirectional strength is required some continuous glass filaments, such as those produced by spinning a large number of monofilaments together, may be fed into the nip of the calender to extend throughout the length of the resultant sheet, at the expense of some loss of mouldability. Each lamination formed on the calender bowl must be very thin so that it wil substantially dry before the next lamination is laid on it. Preferably each lamination is from 0.0004 to 0.001 inch thick.

The sheet, as it comes from the calender, may contain voids and some residual volatile constituents which may spoil the physical properties, translucency and general appearance. If so, it may be reheated and pressed to densify and polish it. This is preferably done in a hydraulic press, but may be done by passage through hot and cold rolls.

Figure 2:
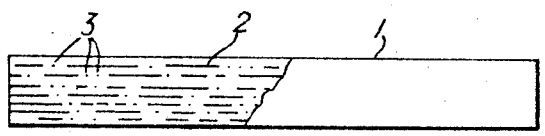

A rigid flat sheet according to the invention is shown diagrammatically in the accompanying drawings, in which:

FIGURE 1 shows a plan view of the sheet (assumed for the sake of simplicity to be partly transparent so that the disposition of the fibres is visible), and FIGURE 2 shows a section of the sheet shown in FIGURE 1.

The polymeric matrix of the sheet is indicated as 1, and reinforcing fibres are shown generally as 2. In FIGURE 1, it can be seen that the fibres are randomly oriented in the plane of the sheet, and from FIGURE 2 it is clear that all the fibres lie substantially parallel to the plane of the sheet. Various fibres, seen end-on in FIGURE 2, are denoted 3.

Some examples will now be given.

Example 1

2.5 parts of asbestos fibre of average length from 0.15 to 0.20 inch were mixed for 15 minutes with 5 parts of a 50% aqueous emulsion of polystyrene (of 50% solids content) in a mixer fitted with central rotating spiked bars. When the fibre was thoroughly wet, 2.5 parts of polystyrene granules in solution in 5 parts of toluene were added and mixing was continued for 30 minutes. After this time, a further 5.0 parts of polystyrene in 10 parts of toluene were added and, finally, 7.5 parts of ¼" staple chopped glass roving was fed slowly into the mixer. Mixing was continued for a further 30 minutes to make a total of 75 minutes.

The dough-like mass produced was transferred to the nip of a calender as described above. A sheet was formed on the large bowl maintained at 140° C. by opening the nip at the rate of 0.0004" per revolution, this being effected by means of a ratchet-and-pawl arrangement.

Final densification and polishing were effected by heating the calendered sheet in an oven at 150° C. for 5 minutes and pressing at ¼ ton per square inch for 1 minute in a hydraulic press fitted with water-cooled platens.

Example 2

30 parts of short asbestos fibre were wetted with 130 parts of an emulsion of a copolymer of styrene and maleate ester (the emulsion containing 50% solids) in a mixer, and then 45 parts of styrene with 2.25 parts of benzoyl peroxide and 1.15 parts of tertiary-butyl perbenzoate were added. Finally 30 parts of ½" chopped glass roving were worked into the mass in the mixer. The mass was formed into a sheet as in Example 1.

Example 3

25 parts of solid polystyrene granules and 15 parts of a masticated copolymer of styrene and butadiene were dissolved in 60 parts of styrene with 3 parts of benzoyl peroxide and 1.5 parts of tertiary-butyl perbenzoate. The resultant solution was mixed with 30 parts of short asbestos fibre and 30 parts of ½ inch chopped glass roving, and then 50 parts of polystyrene emulsion (of 50% solids content) were added and mixed. The subsequent steps were the same as in Example 1.

Further examples of compositions which may be mixed into dough-like masses and converted into sheets described above are as follows:

Example 4

| | Parts |
|---|---|
| Asbestos | 30 |
| ¼" chopped glass roving | 30 |
| Emulsion of styrene—butadiene copolymer (50% solids content) | 50 |
| Solution of polystyrene in toluene (40% solids content) | 60 |

Example 5

| | Parts |
|---|---|
| Asbestos | 50 |
| ¼" chopped glass roving | 50 |
| Emulsion of polystyrene (50% solids content) | 100 |
| Polystyrene-butadiene copolymer | 50 |
| Dissolved in toluene | 180 |

Example 6

| | Parts |
|---|---|
| Asbestos | 50 |
| ¼" chopped glass roving | 50 |
| Emulsion of polystyrene (50% solids content) | 20 |
| Polystyrene granules | 75 |
| Acrylonitrile-butadiene copolymer | 15 |
| Dissolved in toluene | 18 |

Example 7

| | Parts |
|---|---|
| Asbestos | 50 |
| ½" chopped glass roving | 50 |
| Emulsion of copolymer of styrene and di-alphanol maleate | 100 |
| Polystyrene dissolved in toluene (50% solution) | 100 |
| Toluene (as additional wetting agent) | 13 |

Example 8

| | Parts |
|---|---|
| Asbestos | 50 |
| ¼" chopped glass roving | 50 |
| Emulsion of methylmethacrylate (30% solids content) | 50 |
| Solution of copolymer of methylmethacrylate and ethylacrylate dissolved in toluene (40% solids content) | 190 |
| Toluene (as additional wetting agent) | 5 |

Example 9

| | Parts |
|---|---|
| Asbestos | 255 |
| ¼" chopped glass roving | 255 |
| 1½" staple polyester fibre | 90 |
| Solution of polystyrene in catalysed styrene (40% solids content) | 110 |
| Polystyrene emulsion (50% solids content) | 50 |

Sheets produced by the method have exhibited high tensile, compressive, flexural and impact strengths, comparative figures for sheets in which the polymeric constituent was produced from styrene and butadiene, and for similar unreinforced sheets, being given below.

| | Reinforced polystyrene | Unreinforced polystyrene |
|---|---|---|
| Tensile strength | 11,300 p.s.i. | 7,000 p.s.i. |
| Compressive strength | 20,000 p.s.i. | 12,000 p.s.i. |
| Flexural strength | 20,300 p.s.i. | 12,000 p.s.i. |
| Impact strength | 1 ft. lb./inch | 0.6 ft. lb./inch |

A further example will now be given to show the preparation of a rigid sheet containing a minor proportion of polyvinyl chloride.

Example 1

100 lbs. of a 60% solution in toluene of a copolymer of styrene and the diester of maleic acid and "Alphanol," 1½ lbs. of stearic acid, 43½ lbs. polyvinyl chloride powder, 38½ lbs. pulverised talc as filler, 2½ lbs. of a mixture of stabilisers for polyvinyl chloride, ant 19 lbs. of antimony oxide were mixed together for about 45 minutes to form a solution phase. An aqueous phase was formed by mixing 14½ lbs. of an aqueous dispersion of pigment into 110 lbs. of a 50% solid content aqueous emulsion of polystyrene. 174 lbs. of a mixture of grade 3 and grade 4 asbestos fibres were mixed with about one third of the solution phase in a 5 pike mixer over about 50 minutes, and then the remainder of the solution phase was added and mixed in for 5 to 10 minutes. The aqueous phase was then added and the mixing continued for 15 to 20 minutes to form a dough-like mass.

The dough-like mass was then transferred to the nip of a laminating calender of the type previously described. A sheet was formed on the large bowl, maintained at about 140° C., by opening the nip at the rate of 0.0004 inch per revolution by means of a ratchet-and-pawl device, until a sheet of the desired thickness was formed. Four sheets each 0.04 inch thick were then laminated together by pressing in a press at 150° C.

The resultant laminated sheet is suitable for moulding purposes.

If desired, one or more surface layers may be laminated onto the sheets to produce a decorative surface; the product is then suitable for use, for instance, as wall panelling. Thin, decorative or plain-surfaced films or sheets of thermoplastic material can be applied to the reinforced sheets, at the densification stage, to produce attractive decorative surfaces, of improved weathering resistance, or merely to hide the visible fibre pattern on the reinforced sheets. Naturally pigments and fillers may also be included in the sheets, being incorporated as required in the dough-like mass.

I claim:
1. In a method of producing a rigid thermoplastic sheet, the steps of:
   (a) converting (1) a thermoplastic polymeric material in liquid form selected from the group consisting of solutions and emulsions and (2) loose fibres into a substantially homogeneous dough-like mass, said polymeric material being substantially rigid at room temperature and comprising at least a major proportion of a polymeric constituent based on a monomer selected from the group consisting of styrene, methylmethacrylate and acrylonitrile;
   (b) feeding the dough-like mass into the nip between two calender bowls, one of which is heated, and gradually increasing the distance between the bowls, the mass being built up in laminations on the heated bowl; cutting the sheet thus formed on the bowl, and removing it from the bowl; allowing the sheet thus removed to cool to a rigid product.

2. A method according to claim 1 in which the polymeric constituent is introduced into the dough-like mass in part as an aqueous emulsion and in part as a solution.

3. A method according to claim 1 in which the polymeric material comprises in addition a minor proportion of a polymeric constituent selected from the group consisting of homopolymers and copolymers of vinyl chloride.

4. A method according to claim 3 in which vinyl chloride homopolymer is introduced into the dough-like mass in particulate form.

5. A method according to claim 1, in which at least 80% of the fibres have a length of less than 1 inch.

References Cited

UNITED STATES PATENTS

| 3,049,459 | 8/1964 | Smith et al. | 161—184 X |
| 3,045,285 | 7/1962 | Baird et al. | 156—193 X |
| 2,879,547 | 3/1959 | Morris | 161—189 X |

ROBERT F. BURNETTE, Primary Examiner

M. A. LITMAN, Assistant Examiner

U.S. Cl. X.R.

156—243, 246; 161—60, 170; 117—16, 111; 264—216